(12) United States Patent
Hribernik et al.

(10) Patent No.: US 11,905,601 B2
(45) Date of Patent: Feb. 20, 2024

(54) HIGH TEMPERATURE IMAGING MEDIA FOR DIGITAL IMAGE CORRELATION

(71) Applicant: RTX CORPORATION, Farmington, CT (US)

(72) Inventors: Michael L. Hribernik, Jupiter, FL (US); Fred K. Haake, Palm Beach Gardens, FL (US)

(73) Assignee: RTX CORPORATION, Farmington, CT (US)

( * ) Notice: Subject to any disclaimer, the term of this patent is extended or adjusted under 35 U.S.C. 154(b) by 1039 days.

(21) Appl. No.: 16/793,675

(22) Filed: Feb. 18, 2020

(65) Prior Publication Data
US 2020/0181752 A1 Jun. 11, 2020

Related U.S. Application Data

(63) Continuation of application No. 14/460,975, filed on Aug. 15, 2014, now abandoned.

(Continued)

(51) Int. Cl.
*G01L 1/04* (2006.01)
*G01L 1/06* (2006.01)
(Continued)

(52) U.S. Cl.
CPC .................. *C23C 4/08* (2013.01); *C23C 4/10* (2013.01); *C23C 8/00* (2013.01); *C23C 28/321* (2013.01); *C23C 28/322* (2013.01); *C23C 28/345* (2013.01); *C23C 28/3455* (2013.01); *G01L 5/0047* (2013.01); *G01N 3/00* (2013.01);

(Continued)

(58) Field of Classification Search
CPC ..... G01L 1/00; G01L 1/04; G01L 1/06; G01L 1/24; G01L 5/0047; G01N 3/00; G01N 25/005; C23C 4/08; C23C 4/10; C23C 28/321; C23C 28/322; C23C 28/345;
(Continued)

(56) References Cited

U.S. PATENT DOCUMENTS 5,490,426 A * 2/1996 Shiga .................... G01L 1/24
73/762
5,817,945 A * 10/1998 Morris .................... G01L 1/24
73/762

(Continued)

OTHER PUBLICATIONS

Cao et al; "Ceramic Materials for Thermal Barrier Coatings"; Journal of the European Ceramic Society; vol. 24; 2004; pp. 1-10.
(Continued)

*Primary Examiner* — Nguyen Q. Ha
(74) *Attorney, Agent, or Firm* — CANTOR COLBURN LLP

(57) ABSTRACT

A thermal barrier coating is provided. The thermal barrier coating is configured to remain adherent to a substrate under high strains, thus allowing the use of non-contacting strain measurement systems, using digital image correlation for example. The thermal barrier coating may include a first layer of a partially metallic material configured to adhere to a metallic substrate, and a second layer of a partially ceramic material configured to adhere to the first layer. A successful configuration has a top layer thickness that is approximately two-thirds of the first layer thickness.

13 Claims, 3 Drawing Sheets

Related U.S. Application Data

(60) Provisional application No. 61/900,752, filed on Nov. 6, 2013.

(51) Int. Cl.

| | | |
|---|---|---|
| *G01L 1/24* | (2006.01) | |
| *C23C 4/08* | (2016.01) | |
| *C23C 28/00* | (2006.01) | |
| *C23C 4/10* | (2016.01) | |
| *G01L 5/00* | (2006.01) | |
| *G01N 3/00* | (2006.01) | |
| *G01N 25/00* | (2006.01) | |
| *C23C 8/00* | (2006.01) | |

(52) U.S. Cl.
CPC ...... *G01N 25/005* (2013.01); *Y10T 428/2495* (2015.01); *Y10T 428/24975* (2015.01)

(58) Field of Classification Search
CPC ........... C23C 28/3455; Y10T 428/2495; Y10T 428/24975
See application file for complete search history.

(56) References Cited

U.S. PATENT DOCUMENTS

| | | | | |
|---|---|---|---|---|
| 6,072,568 A * | 6/2000 | Paton | ................ | G01L 5/0047 |
| | | | | 73/800 |
| 6,106,959 A | 8/2000 | Vance et al. | | |
| 6,327,030 B1 * | 12/2001 | Ifju | .................. | G01B 11/20 |
| | | | | 73/762 |
| 6,943,869 B2 * | 9/2005 | Hubner | ................ | G01L 1/241 |
| | | | | 356/34 |
| 7,740,948 B1 | 6/2010 | Alvin | | |
| 7,769,550 B2 * | 8/2010 | Hyodo | .................... | G01L 1/248 |
| | | | | 702/42 |
| 7,918,141 B1 * | 4/2011 | Sathish | .................... | G01N 3/60 |
| | | | | 73/800 |
| 8,432,537 B2 * | 4/2013 | Lam | ..................... | G01B 11/168 |
| | | | | 356/35 |
| 8,720,278 B1 * | 5/2014 | Toivola | ............... | G01M 5/0041 |
| | | | | 73/762 |
| 9,311,566 B2 * | 4/2016 | Iliopoulos | .............. | G01N 3/068 |
| 2003/0027013 A1 | 2/2003 | Schaeffer et al. | | |
| 2004/0096314 A1 | 5/2004 | Kool et al. | | |
| 2005/0142392 A1 | 6/2005 | Spitsberg et al. | | |
| 2007/0071905 A1 | 3/2007 | Schaeffer et al. | | |
| 2009/0312956 A1 | 12/2009 | Zombo et al. | | |
| 2010/0028711 A1 | 2/2010 | Helmick et al. | | |
| 2015/0025815 A1 * | 1/2015 | Sebastiani | ............. | G01L 5/0047 |
| | | | | 702/42 |
| 2015/0125681 A1 | 5/2015 | Hribernik et al. | | |

OTHER PUBLICATIONS

Hillery et al., "Coatings for high-tempurature structural materials; trends and opportunities." National Materials Advisory Board Report, National Academy Press, 1996.

Mao et al., "Multiscale monitoring of interface failure of brittle coating/ductile substrate systems: A non-destructive evaluation method combined digital image correlation with acoustic emission", Journal of Applied Physics, 110, 084903, 2011, 6 pages.

* cited by examiner

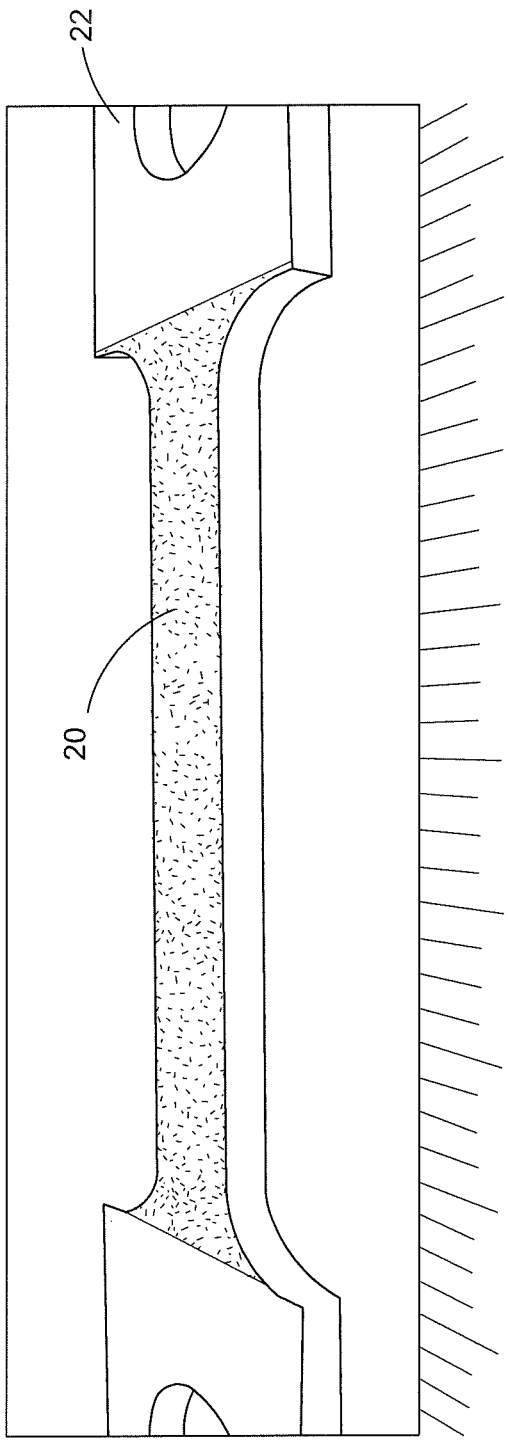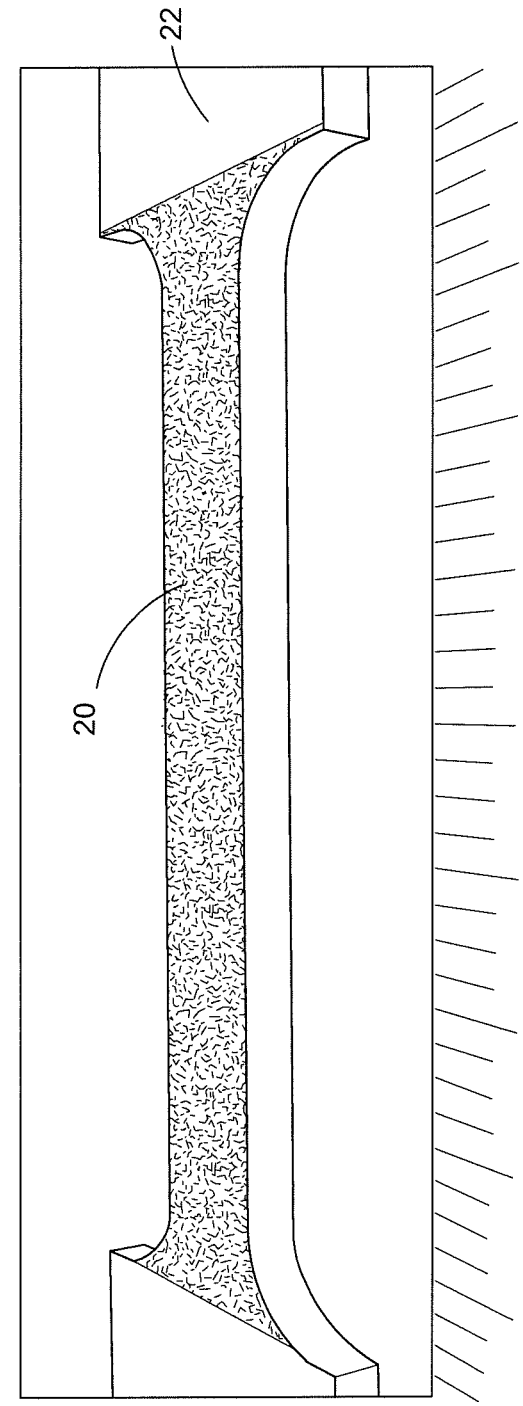

HIGH TEMPERATURE IMAGING MEDIA FOR DIGITAL IMAGE CORRELATION

CROSS REFERENCE TO RELATED APPLICATIONS

This application is a continuation application of U.S. patent application Ser. No. 14/460,975, filed on Aug. 15, 2014, which claims the benefit of U.S. Provisional Patent Application No. 61/900,752 filed Nov. 6, 2013, both of which are incorporated by reference herein in their entirety.

FIELD OF THE DISCLOSURE

The present disclosure generally relates to thermal barrier coatings, and particularly to thermal barrier coatings for use in non-contact characterization of high temperature materials.

BACKGROUND OF THE DISCLOSURE

Thermal barrier coatings are applied to a variety of materials typically exposed to high temperature or high temperature gradient environments. Thermal barrier coatings are typically applied to the surfaces of metallic substrates to insulate and protect the general integrity of the metallic substrates from prolonged thermal loads. The unique characteristics of thermal barrier coatings allow for use in non-contact strain measurements of the metallic substrates which may be exposed to high temperature or high temperature gradient environments.

Conventional thermal barrier coatings are comprised of two or more layers, such as a bond coat, a thermally grown oxide and a top layer. The bond coat is typically formed of a metallic material or metal alloy which provides an adhering interface between the top coat and the substrate. Existing non-contact strain measurements are limited to relatively low temperatures (<1000° F.), and strain levels less than ~10%. These limits are associated with the materials, such as ceramic paint, used to provide optical contrast.

Ceramic paints are limited both in temperature capability and strain compatibility. They are susceptible to spalling and flaking at high strain levels. Degradation of this type will preclude successful use of a non-contact strain measurement technique such as digital image correlation. The present disclosure is directed at addressing one or more of the deficiencies set forth above.

SUMMARY OF THE DISCLOSURE

In accordance with one aspect of the disclosure, a thermal barrier coating is provided. The thermal barrier coating includes a bond layer having a first thickness, and a top layer having a second thickness that is approximately two-thirds of the first thickness.

In a refinement, one or more of the bond layer and the top layer may be configured to maintain substantial adherence with a metallic substrate at temperatures of at least approximately 1400° F. and under strain levels of at least approximately 30%.

In accordance with another aspect of the disclosure, a thermal barrier coating is provided. The thermal barrier coating includes a metallic bond coat having a thickness of approximately 0.003 inches, and a second layer ceramic top coat having a thickness of approximately 0.002 inches.

In accordance with yet another aspect of the disclosure, a method of applying a thermal barrier coating onto a metallic substrate is provided. The method includes applying a first layer of a partially metallic material of a first thickness to a surface of the metallic substrate; and applying a second layer of a partially ceramic material of a second thickness to the first layer. The second layer is applied such that the second thickness is approximately two-thirds of the first thickness.

These and other aspects of this disclosure will become more readily apparent upon reading the following detailed description when taken in conjunction with the accompanying drawings.

BRIEF DESCRIPTION OF THE DRAWINGS

FIG. 2 is a perspective view of a sample substrate having a thermal barrier coating applied thereon;

FIG. 3 is a perspective view of the sample substrate of FIG. 2 with a thermal barrier coating thereon at 1400° F. after 10% strain;

Figure 1:
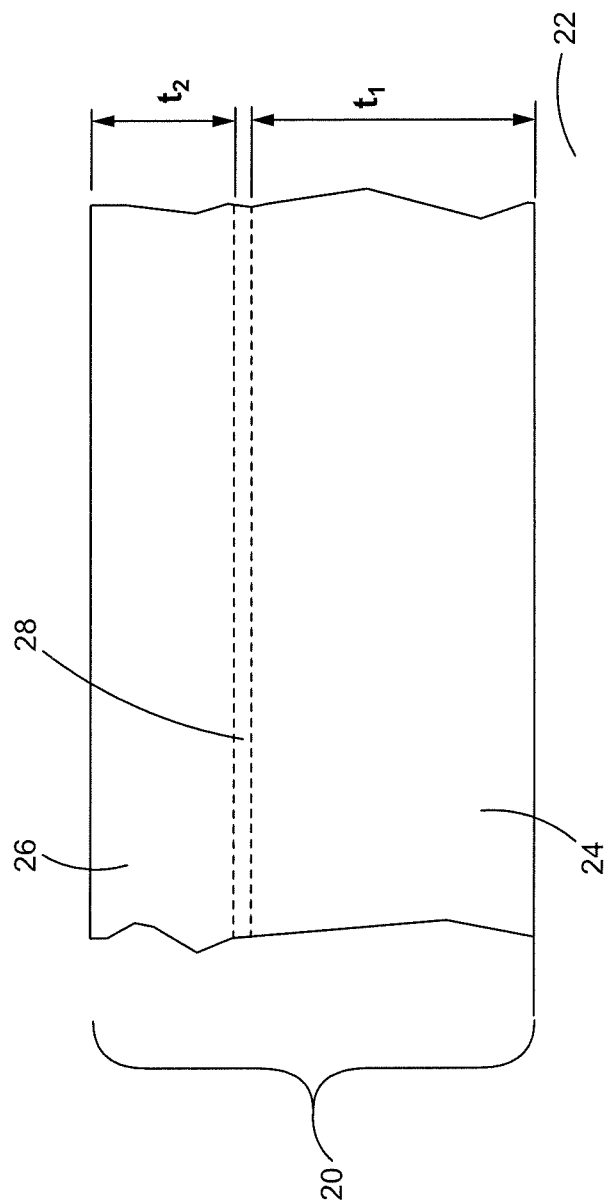
FIG. 1 is an enlarged, cross-sectional view of one exemplary thermal barrier coating constructed in accordance with the teachings of the present disclosure.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling with the spirit and scope of the present disclosure.

DETAILED DESCRIPTION

Referring to FIG. 1, one exemplary embodiment of a thermal barrier coating 20 which may be applied to a metallic substrate 22 is provided. As shown, the thermal bather coating 20 may include a plurality of layers configured to bond against one another as well as with a given surface of the metallic substrate 22 in a manner which substantially withstands relatively high temperatures, for example, approximately 1400 F or greater, and relatively high strain levels, for example, strain levels of approximately 30% or greater. More particularly, the thermal barrier coating 20 may be structured to substantially maintain the integrity thereof and thereby enable non-contact characterization of the metallic substrate 22, such as by digital image correlation, or the like, under both high temperature and high strain conditions.

As shown in FIG. 1, the thermal barrier coating 20 may include a first coat or bond layer 24 that is configured to adhere or bond with a surface of a metallic substrate 22. More specifically, the first layer 24 may be applied in the form of a bond coat or layer 24 as is commonly used in the art. The bond layer 24 may be generally metallic, or at least partially composed of a metallic substance or material, such as in the form of a metal alloy, or the like. Moreover, the bond layer 24 may be composed of any material commonly used in the art that is suited to adhere to the metallic substrate 22 and provide a sufficient interface between the metallic substrate 22 and any one or more additional layers of the thermal barrier coating 20. Furthermore, the bond layer 24 may be applied onto the surface of the metallic substrate 22 in the form of a spray or any other means conventionally used in the art.

The thermal barrier coating 20 of FIG. 1 may additionally include a second layer 26 that is configured to adhere or bond with the first or bond layer 24 so as to generally protect the first or bond layer 24. The second layer 26 may be applied, for example, via spray, or the like, onto the bond layer 24 in the form of a top coat or layer 26 as is commonly used in the art, and composed of a generally ceramic material. For example, the top layer 26 may include any one or more of yttria-stabilized zirconia (YSZ), alumina compounds, or any other material capable of sufficiently adhering with the bond layer 24.

Still referring to FIG. 1, the thermal barrier coating 20 may additionally include a third layer or a thermally grown oxide layer 28 that is generally disposed between the first layer 24 and the second layer 26. In particular, the thermally grown oxide layer 28 may be composed of a slow-growing oxide that is formed through oxidation of the bond layer 24, which may further serve to generally protect the bond layer 24.

Furthermore, the bond layer 24 and the top layer 26 of the thermal barrier coating 20 of FIG. 1 may be provided with different thicknesses to exhibit different properties under high temperatures and high strain levels. As shown in FIG. 1, for example, the bond layer 24 may be provided with a thickness of $t_1$, while the top layer 26 may be provided with a thickness of $t_2$. Moreover, the bond layer 24 and the top layer 26 may be configured such that the second thickness $t_2$ is approximately two-thirds of the first thickness $t_1$. For example, the bond layer 24 may have a thickness of approximately 0.003 inches and the top layer 26 may have a thickness of approximately 0.002 inches. Such thicknesses of the bond layer 24 and the top layer 26 have been found to exhibit desirable results under high temperatures (approximately 1400° F. to approximately 1600° F. or greater) and high levels of strain (approximately 30% to approximately 40% or greater).

Figure 4:
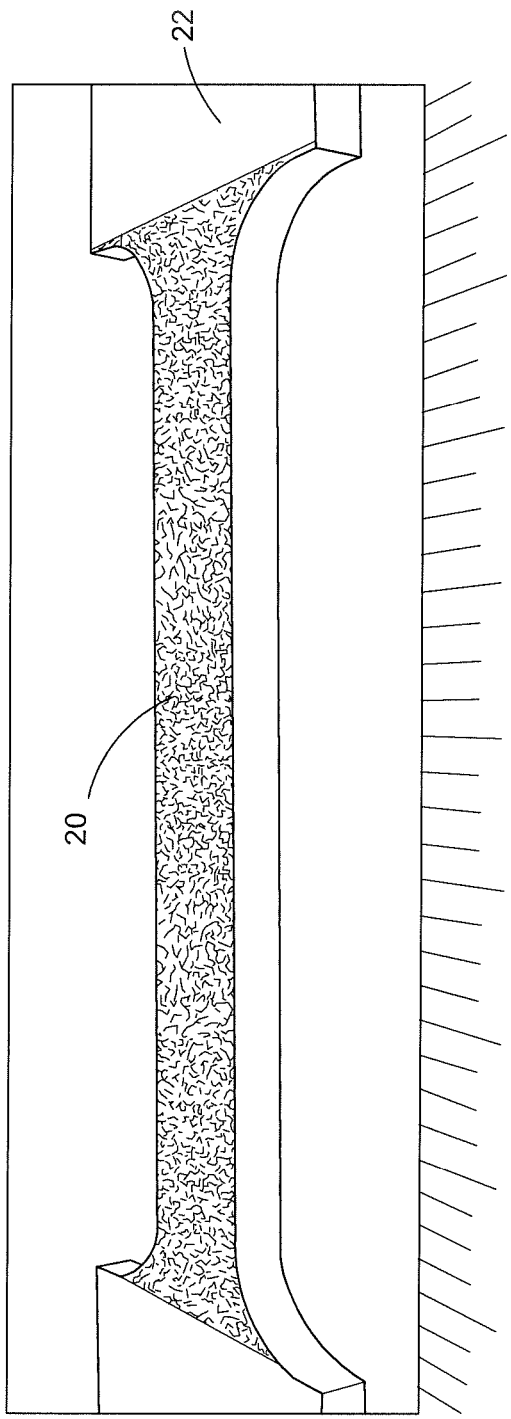
FIG. 4 is a perspective view of the sample substrate of FIG. 2 with a thermal barrier coating thereon at 1400° F. after 20% strain.
Figure 5:
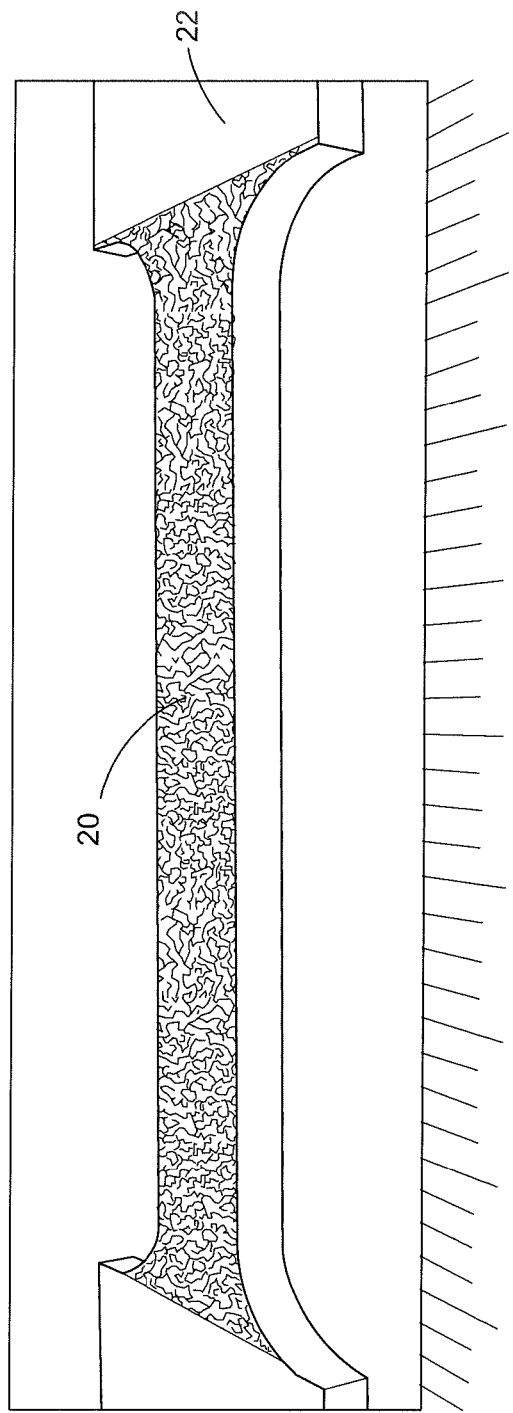
FIG. 5 is a perspective view of the sample substrate of FIG. 2 with a thermal barrier coating thereon at 1400° F. after 30% strain.

Turning now to FIGS. 2-5, one exemplary thermal barrier coating 20 is applied to a sample metallic substrate 22 and tested under high temperature and high strain conditions. For example, the thermal barrier coating 20 applied may include a bond layer 24 having a thickness of approximately 0.003 inches and two passes of a top layer 26 having an overall thickness of approximately 0.002 inches. As shown, FIG. 2 illustrates the substrate 22 as coated with the thermal barrier coating 20 as described and prior to being subjected to any high temperatures or high strain conditions. Furthermore, FIG. 3 illustrates the thermal barrier coating 20 at 1400° F. after 10% strain, FIG. 4 illustrates the thermal barrier coating 20 at 1400° F. after 20% strain, and FIG. 5 illustrates the thermal barrier coating 20 at 1400° F. after 30% strain. As more clearly shown in FIG. 5, the integrity of the thermal barrier coating 20 may be substantially intact while exhibiting surface cracks under high temperatures and high levels of strain. Moreover, the network of surface cracks are desirable as they are indicative of coating behavior with the ability to assess or map relatively high levels of strain on the sample substrate 22 using non-contact characterization means, such as digital image correlation, or the like, that was otherwise not possible under such high temperatures due to flaking, spalling, or other modes of degradation.

The foregoing disclosure is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the present disclosure may be practiced other than as specifically described. For that reason, the appended claims should be studied to determine true scope and content.

What is claimed is:

1. A method of measuring strain in a metallic substrate, the method comprising applying digital image correlation to a metallic substrate having a thermal barrier coating wherein the thermal barrier coating comprises a bond layer disposed on the metallic substrate and a top layer disposed on the bond layer,
    wherein the thermal barrier coating further comprises a thermally grown oxide layer disposed between the bond layer and the top layer.

2. The method of claim 1, wherein the bond layer has a thickness and the top layer has a thickness and the thickness of the top layer is two thirds of the bond layer thickness of the bond layer.

3. The method of claim 1, wherein the bond layer has a thickness of 0.003 inches and the top layer has a thickness of 0.002 inches.

4. The method of claim 1, wherein the top layer comprises yttria-stabilized zirconia.

5. The method of claim 1, wherein the top layer comprises alumina.

6. The method of claim 1, wherein digital image correlation is applied after the substrate and thermal barrier coating are subjected to a temperature of 1400° F. and a strain of 10-30%.

7. The method of claim 1, wherein digital image correlation is applied after the substrate and thermal barrier coating are subjected to a temperature of 1400° F. to 1600° F. and a strain of 30-40%.

8. A method of measuring strain in a metallic substrate, the method comprising applying digital image correlation to a metallic substrate having a thermal barrier coating wherein the thermal barrier coating comprises a bond layer disposed on the metallic substrate and a top layer disposed on the bond layer and the top layer has a thickness that is two thirds of a thickness of the bond layer,
    wherein the top layer comprises yttria-stabilized zirconia or alumina.

9. The method of claim 8, wherein the bond layer has a thickness of 0.003 inches and the top layer has a thickness of 0.002 inches.

10. The method of claim 8, wherein the top layer comprises yttria-stabilized zirconia.

11. The method of claim 8, wherein the top layer comprises alumina.

12. The method of claim 8, wherein digital image correlation is applied after the substrate and thermal barrier coating are subjected to a temperature of 1400° F. and a strain of 10-30%.

13. The method of claim 8, wherein digital image correlation is applied after the substrate and thermal barrier coating are subjected to a temperature of 1400° F. to 1600° F. and a strain of 30-40%.

* * * * *